(12) United States Patent
Liao et al.

(10) Patent No.: US 10,878,259 B2
(45) Date of Patent: Dec. 29, 2020

(54) VEHICLE DETECTING METHOD, NIGHTTIME VEHICLE DETECTING METHOD BASED ON DYNAMIC LIGHT INTENSITY AND SYSTEM THEREOF

(71) Applicant: Automotive Research & Testing Center, Changhua County (TW)

(72) Inventors: Po-Hsiang Liao, Changhua County (TW); Hung-Pang Lin, Changhua County (TW); Yu-Lung Chang, Changhua County (TW); Li-You Hsu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 118 days.

(21) Appl. No.: 16/198,896

(22) Filed: Nov. 23, 2018

(65) Prior Publication Data
US 2020/0125869 A1 Apr. 23, 2020

(30) Foreign Application Priority Data
Oct. 17, 2018 (TW) .............................. 107136583 A

(51) Int. Cl.
*G06K 9/00* (2006.01)
*G06T 7/246* (2017.01)
*G06K 9/46* (2006.01)
*G06T 7/90* (2017.01)

(52) U.S. Cl.
CPC ....... *G06K 9/00825* (2013.01); *G06K 9/4647* (2013.01); *G06K 9/4652* (2013.01); *G06K 9/4661* (2013.01); *G06T 7/246* (2017.01); *G06T 7/90* (2017.01); *G06T 2207/10024* (2013.01); *G06T 2207/20021* (2013.01); *G06T 2207/30252* (2013.01)

(58) Field of Classification Search
None
See application file for complete search history.

(56) References Cited

U.S. PATENT DOCUMENTS

| 7,566,851 B2 | 7/2009 | Stein et al. |
| 2006/0140447 A1 | 6/2006 | Park et al. |
| 2017/0144585 A1* | 5/2017 | Ogawa ................. G06K 9/6215 |

FOREIGN PATENT DOCUMENTS

| CN | 107507245 A | 12/2017 |
| TW | I452540 B | 9/2014 |

* cited by examiner

*Primary Examiner* — Leon Flores
(74) *Attorney, Agent, or Firm* — CKC & Partners Co., LLC

(57) ABSTRACT

A nighttime vehicle detecting method is for capturing an image by a camera and driving a computing unit to compute the image and then detect a highlight point of the image. The nighttime vehicle detecting method is for driving the computing unit to perform a communicating region labeling algorithm to label a plurality of highlight pixels connected to each other as a communicating region value, and then performing an area filtering algorithm to analyze an area of the highlight pixels connected to each other and judge whether the highlight pixels connected to each other are a vehicle lamp or not according to a size of the area. The nighttime vehicle detecting method is for driving the computing unit to perform an optical flow algorithm to obtain a speed of the vehicle lamp, and then filtering the vehicle lamp moved at the speed smaller than a predetermined speed.

19 Claims, 13 Drawing Sheets

VEHICLE DETECTING METHOD, NIGHTTIME VEHICLE DETECTING METHOD BASED ON DYNAMIC LIGHT INTENSITY AND SYSTEM THEREOF

RELATED APPLICATIONS

This application claims priority to Taiwan Application Serial Number 107136583 filed on Oct. 17, 2018, which is herein incorporated by reference.

BACKGROUND

Technical Field

The present disclosure relates to a vehicle detecting method and a system thereof. More particularly, the present disclosure relates to a vehicle detecting method, a nighttime vehicle detecting method based on dynamic light intensity and a system thereof.

Description of Related Art

A forward collision warning algorithm utilizes a lane line identifying method to identify a lane line of an image, and then judges whether a relative distance between a driving vehicle and a front vehicle is safe or not according to a front vehicle identifying method.

In one conventional front vehicle identifying method, a classifier is used to obtain a plurality of relevant parameters after training, and then the relevant parameters are configured to identify the front vehicle, such as neural networks algorithms and deep learning algorithms. The conventional front vehicle identifying method can identify the front vehicle, but the complexity of the conventional front vehicle identifying method is high. Moreover, because of dim light in a nighttime, there is fewer features of the front vehicle in the image so as to produce lower detection efficiency.

Therefore, a vehicle detecting method, a nighttime vehicle detecting method based on dynamic light intensity and a system thereof having the features of low complexity, real-time detection and high accuracy are commercially desirable.

SUMMARY

According to one aspect of the present disclosure, a nighttime vehicle detecting method based on dynamic light intensity includes a highlight detecting step, a vehicle lamp judging step, an optical flow filtering step and a distance estimating step. The highlight detecting step is for capturing an image by a camera and driving a computing unit to compute the image and then detect a highlight point of the image. The highlight point includes a plurality of highlight pixels, and the camera and the computing unit are disposed on a driving vehicle. The vehicle lamp judging step is for driving the computing unit to perform a communicating region labeling algorithm to label the highlight pixels connected to each other as a communicating region value, and then performing an area filtering algorithm to analyze an area of the highlight pixels connected to each other and judge whether the highlight pixels connected to each other are a vehicle lamp or not according to a size of the area. The optical flow filtering step is for driving the computing unit to perform an optical flow algorithm to obtain a speed of the vehicle lamp, and then filtering the vehicle lamp moved at the speed smaller than a predetermined speed. The distance estimating step is for driving the computing unit to perform a coordinate conversion algorithm to estimate a distance between the vehicle lamp and the camera.

According to another aspect of the present disclosure, a nighttime vehicle detecting system based on dynamic light intensity includes a camera and a computing unit. The camera is disposed on a driving vehicle and configured to capture an image. The computing unit is disposed on the driving vehicle and includes a highlight detecting module, a vehicle lamp judging module, an optical flow filtering module and a distance estimating module. The highlight detecting module is signally connected to the camera. The highlight detecting module is configured to compute the image and then detect a highlight point of the image, and the highlight point includes a plurality of highlight pixels. The vehicle lamp judging module is signally connected to the highlight detecting module. The vehicle lamp judging module is configured to perform a communicating region labeling algorithm to label the highlight pixels connected to each other as a communicating region value. Then, the vehicle lamp judging module is configured to perform an area filtering algorithm to analyze an area of the highlight pixels connected to each other and judge whether the highlight pixels connected to each other are a vehicle lamp or not according to a size of the area. The optical flow filtering module is signally connected to the vehicle lamp judging module. The optical flow filtering module is configured to perform an optical flow algorithm to obtain a speed of the vehicle lamp, and then filter the vehicle lamp moved at the speed smaller than a predetermined speed. The distance estimating module is signally connected to the optical flow filtering module. The distance estimating module is configured to perform a coordinate conversion algorithm to estimate a distance between the vehicle lamp and the camera.

According to further another aspect of the present disclosure, a vehicle detecting method for detecting a front vehicle of an image includes an image analyzing step and a vehicle detecting step. The image analyzing step is for capturing an image by a camera and driving a computing unit to analyze a sky brightness value of a sky region of the image and compare a predetermined brightness value with the sky brightness value to judge whether the image is in a daytime or a nighttime. The camera and the computing unit are disposed on a driving vehicle. The vehicle detecting step is for driving the computing unit to perform a daytime vehicle detecting step or a nighttime vehicle detecting step. When the image is in the daytime, the daytime vehicle detecting step is performed. When the image is in the nighttime, the nighttime vehicle detecting step is performed. The daytime vehicle detecting step is for detecting a distance between the front vehicle and the camera according to a forward collision warning algorithm. The nighttime vehicle detecting step includes a highlight detecting step, a vehicle lamp judging step, an optical flow filtering step and a distance estimating step. The highlight detecting step is for driving the computing unit to compute the image and then detect a highlight point of the image, and the highlight point includes a plurality of highlight pixels. The vehicle lamp judging step is for driving the computing unit to perform a communicating region labeling algorithm to label the highlight pixels connected to each other as a communicating region value, and then performing an area filtering algorithm to analyze an area of the highlight pixels connected to each other and judge whether the highlight pixels connected to each other are a vehicle lamp or not according to a size of the area. The optical flow filtering step is for driving the computing unit to perform an optical flow algorithm to obtain a speed of the vehicle lamp, and then filtering the vehicle lamp moved at the speed smaller than a predetermined speed. The distance estimating step is for driving the computing unit to perform a coordinate conversion algorithm to estimate a distance between the vehicle lamp and the camera.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or mechanism or module) is referred to as be "disposed on" or "connected to" another element, it can be directly disposed on or connected to the other element, or it can be indirectly disposed on or connected to the other element, that is, intervening elements may be present. In contrast, when an element is referred to as be "directly disposed on" or "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
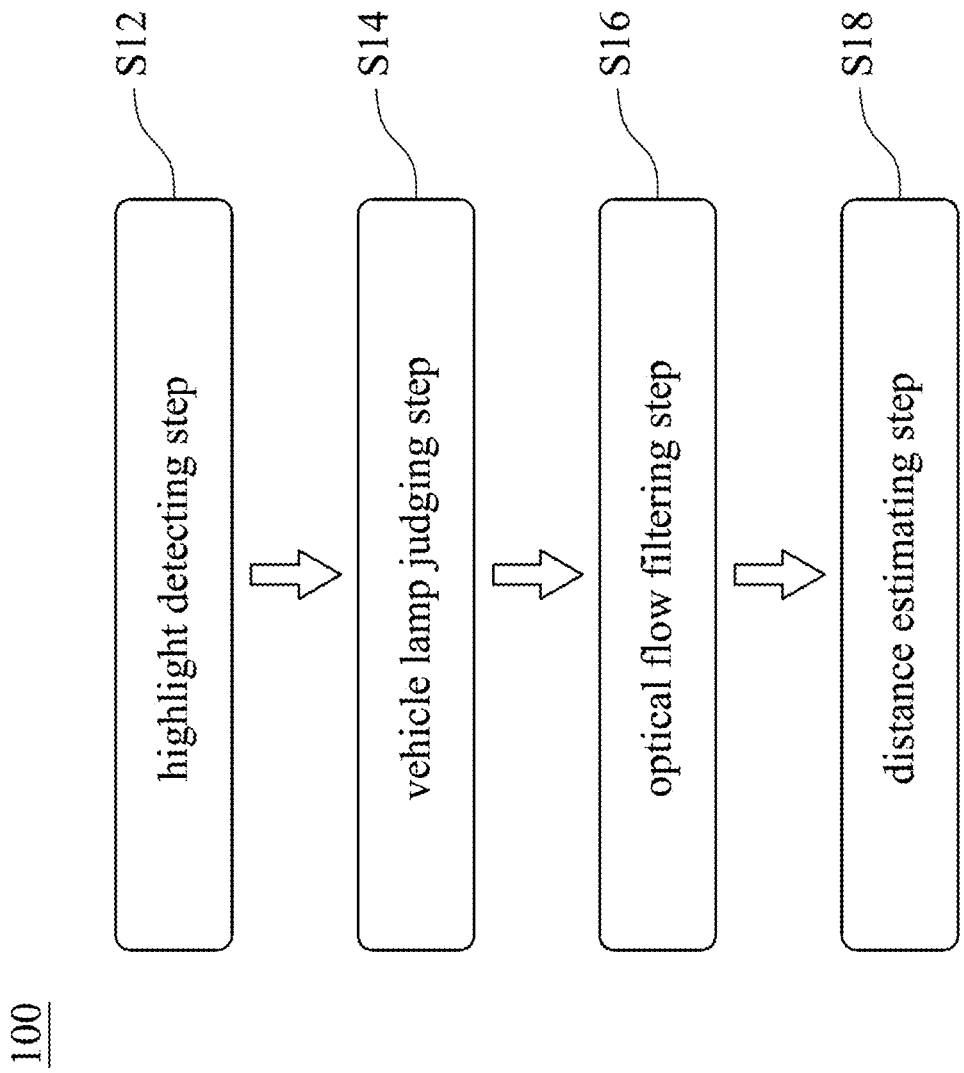
FIG. 1 shows a flow chart of a nighttime vehicle detecting method based on dynamic light intensity according to one embodiment of the present disclosure.
Figure 2:
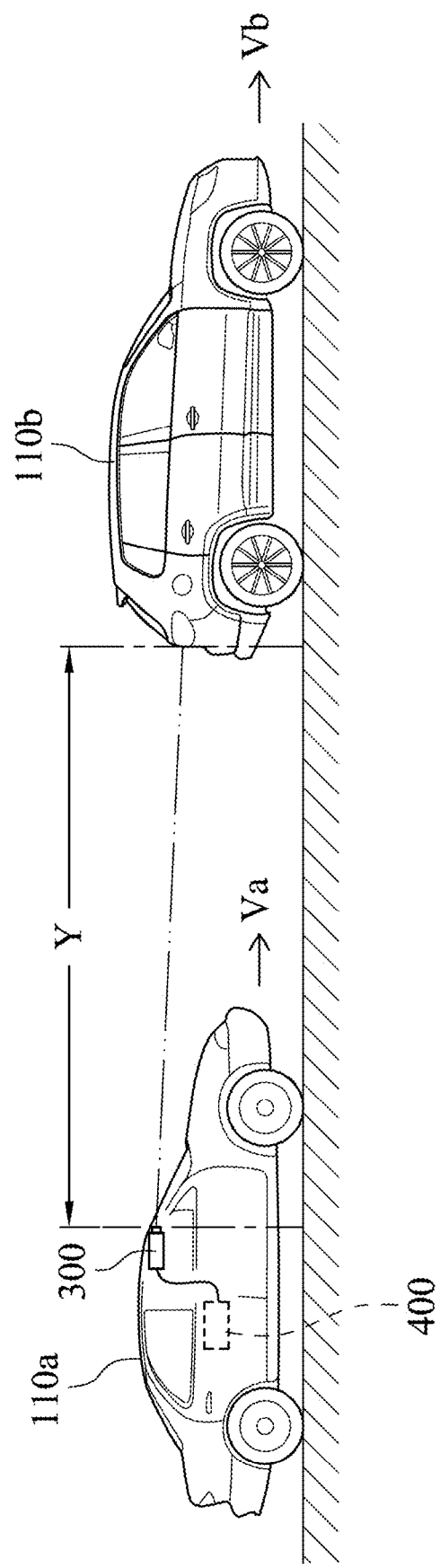
FIG. 2 shows a schematic view of a driving vehicle and a front vehicle of FIG. 1.

FIG. 1 shows a flow chart of a nighttime vehicle detecting method 100 based on dynamic light intensity according to one embodiment of the present disclosure. FIG. 2 shows a schematic view of a driving vehicle 110a and a front vehicle 110b of FIG. 1. The nighttime vehicle detecting method 100 based on dynamic light intensity is for detecting a distance Y between the camera 300 of the driving vehicle 110a and the vehicle lamp of the front vehicle 110b in a nighttime. The nighttime vehicle detecting method 100 based on dynamic light intensity includes a highlight detecting step S12, a vehicle lamp judging step S14, an optical flow filtering step S16 and a distance estimating step S18.

The highlight detecting step S12 is for capturing an image by a camera 300 and driving a computing unit 400 to compute the image and then detect a highlight point of the image. The highlight point includes a plurality of highlight pixels, and the camera 300 and the computing unit 400 are disposed on the driving vehicle 110a. The vehicle lamp judging step S14 is for driving the computing unit 400 to perform a communicating region labeling algorithm to label the highlight pixels connected to each other as a communicating region value, and then performing an area filtering algorithm to analyze an area of the highlight pixels connected to each other and judge whether the highlight pixels connected to each other are a vehicle lamp or not according to a size of the area. The optical flow filtering step S16 is for driving the computing unit 400 to perform an optical flow algorithm to obtain a speed Vb of the vehicle lamp, and then filtering the vehicle lamp moved at the speed Vb smaller than a predetermined speed. The driving vehicle 110a is moved at a speed Va. The front vehicle 110b is moved at the speed Vb. The distance estimating step S18 is for driving the computing unit 400 to perform a coordinate conversion algorithm to estimate the distance Y between the camera 300 and the vehicle lamp (e.g., a taillight of the front vehicle 110b) moved at the speed Vb greater than or equal to the predetermined speed. Therefore, the nighttime vehicle detecting method 100 based on dynamic light intensity of the present disclosure utilizes image processing techniques to detect the highlight point of the image, and the optical flow algorithm is used to eliminate noises located outside of an original lane so as to obtain an accurate position of the vehicle lamp in real time. Additionally, the image processing techniques of the present disclosure can greatly reduce computational complexity and is simpler than conventional classifiers (e.g., a radial basis function (RBF) or a support vector machine (SVM)) so as to improve a data processing speed. The front vehicle 110b of the present disclosure is a car, but it is not limited thereto. The front vehicle 110b may be a motorcycle or any vehicle having the vehicle lamp.

Figure 3:
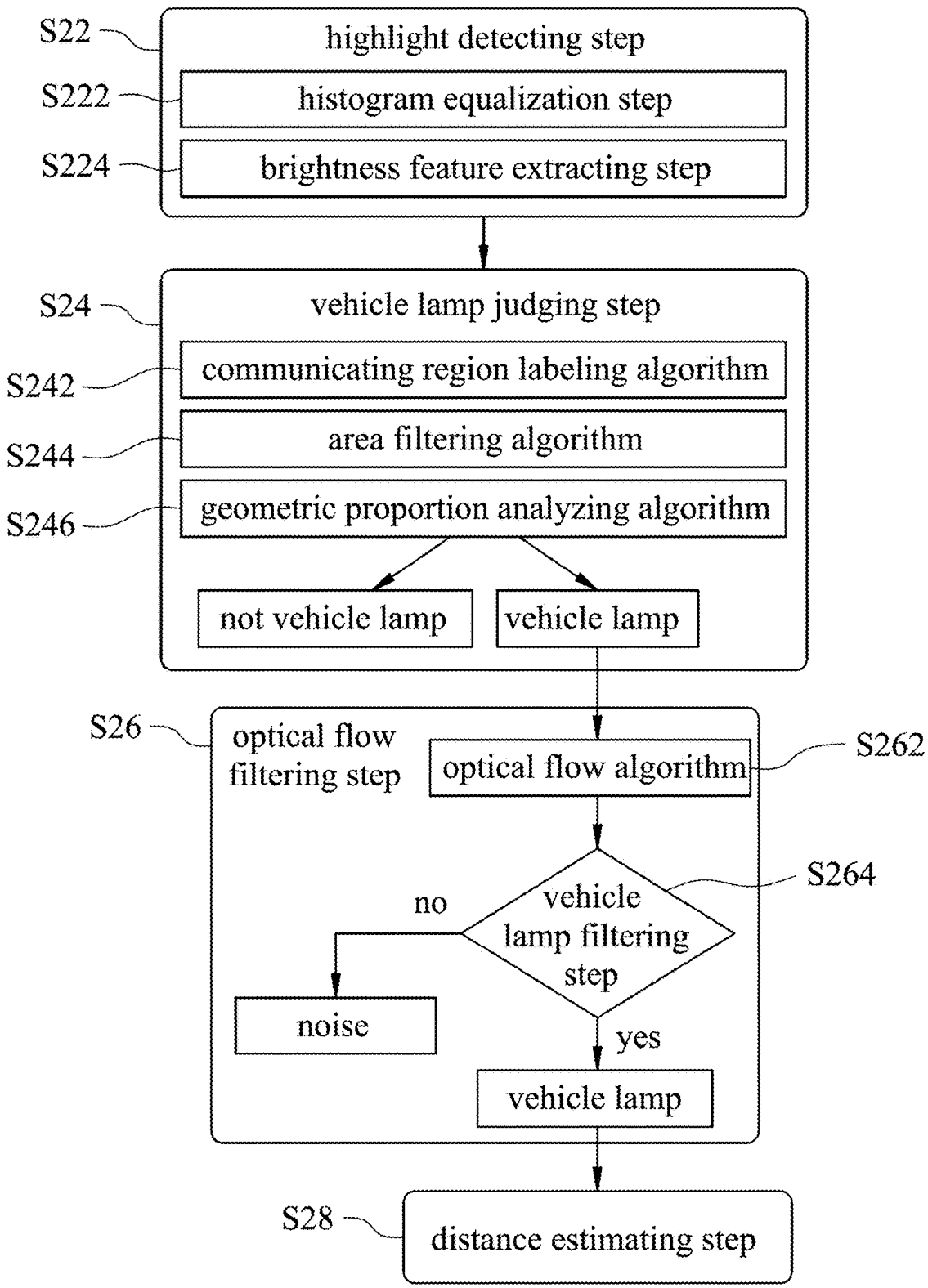
FIG. 3 shows a flow chart of a nighttime vehicle detecting method based on dynamic light intensity according to another embodiment of the present disclosure.
Figure 4:
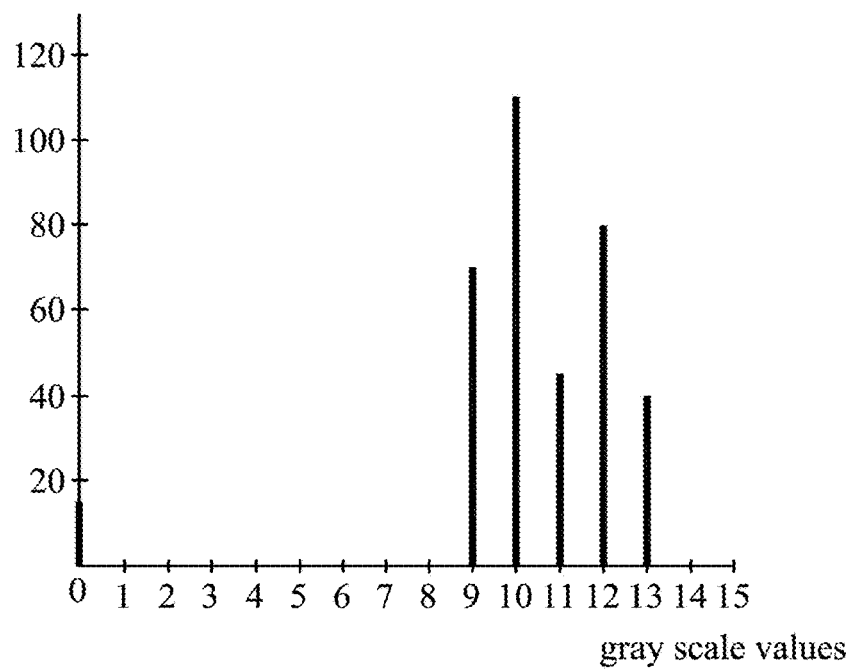
FIG. 4 shows a schematic view of a histogram equalization step of FIG. 3.
Figure 4:
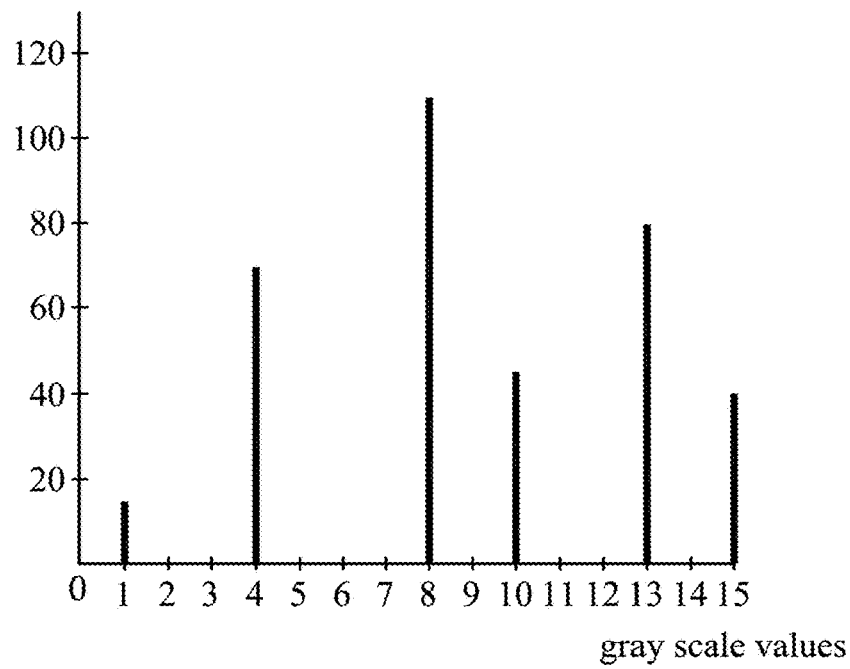
Figure 5:
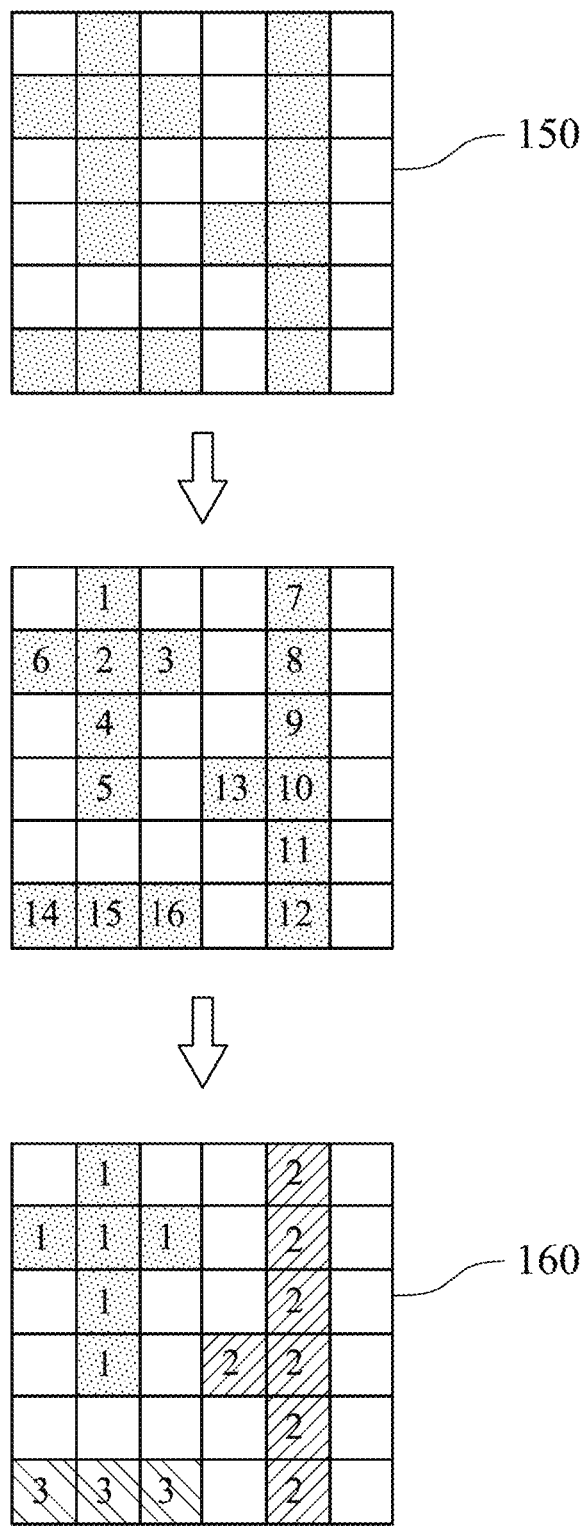
FIG. 5 shows a schematic view of a communicating region labeling algorithm of FIG. 3.
Figure 6:
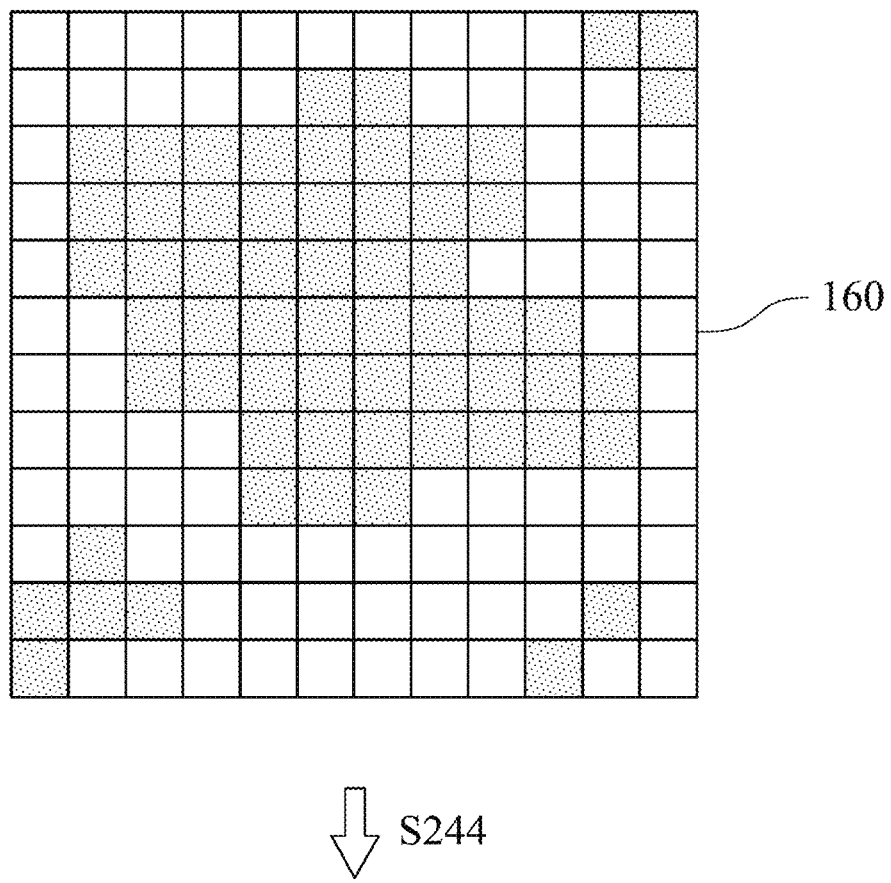
FIG. 6 shows a schematic view of an area filtering algorithm of FIG. 3.
Figure 6:
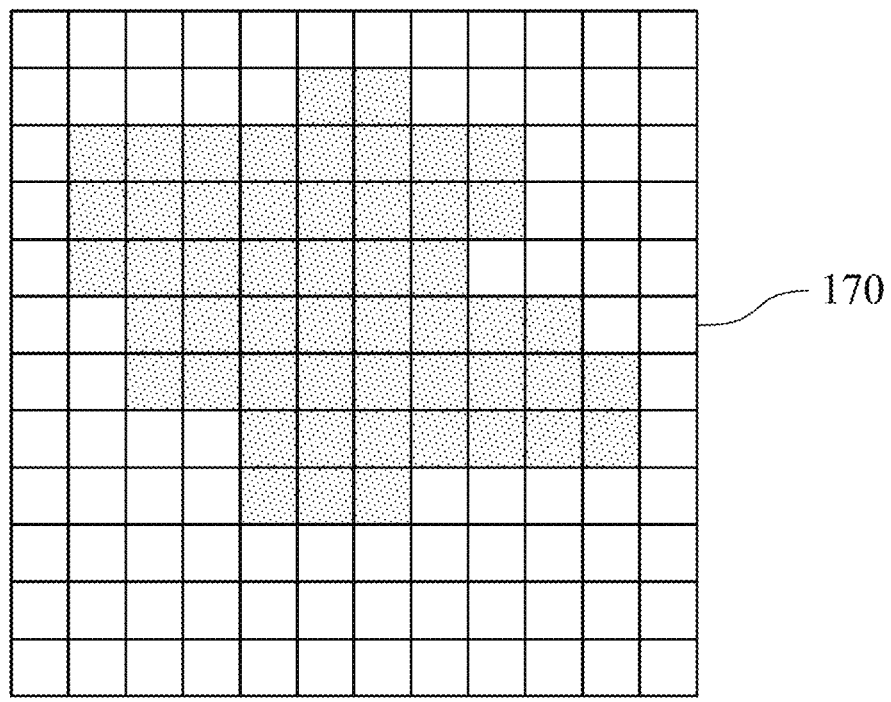
Figure 7:
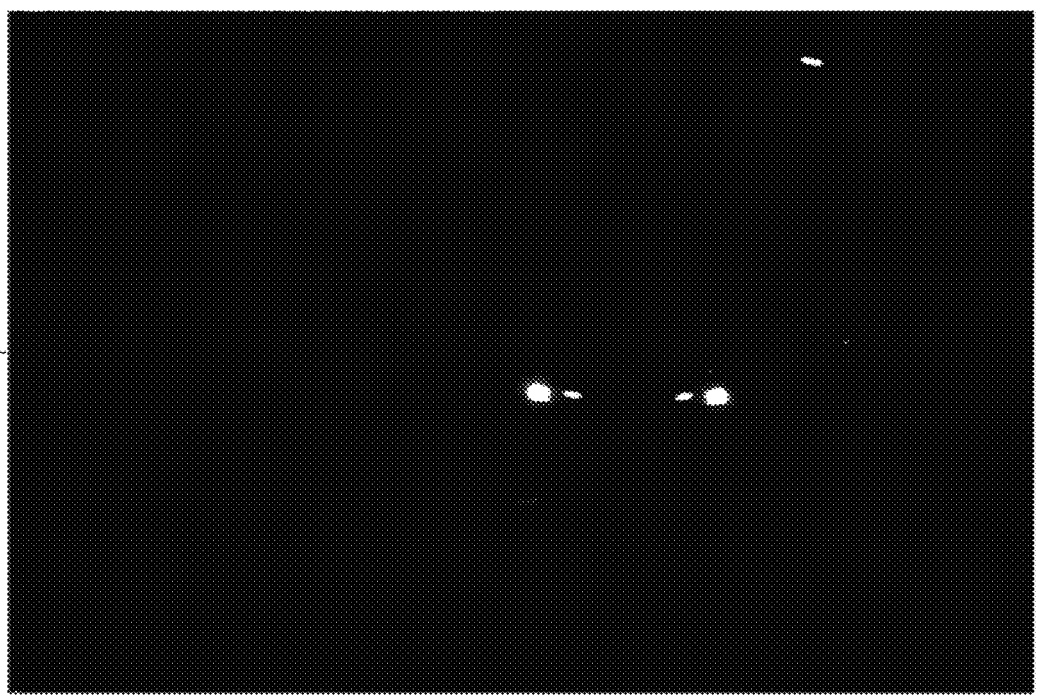
FIG. 7 shows an image captured by a camera in a highlight detecting step of the nighttime vehicle detecting method of FIG. 3.
Figure 8:
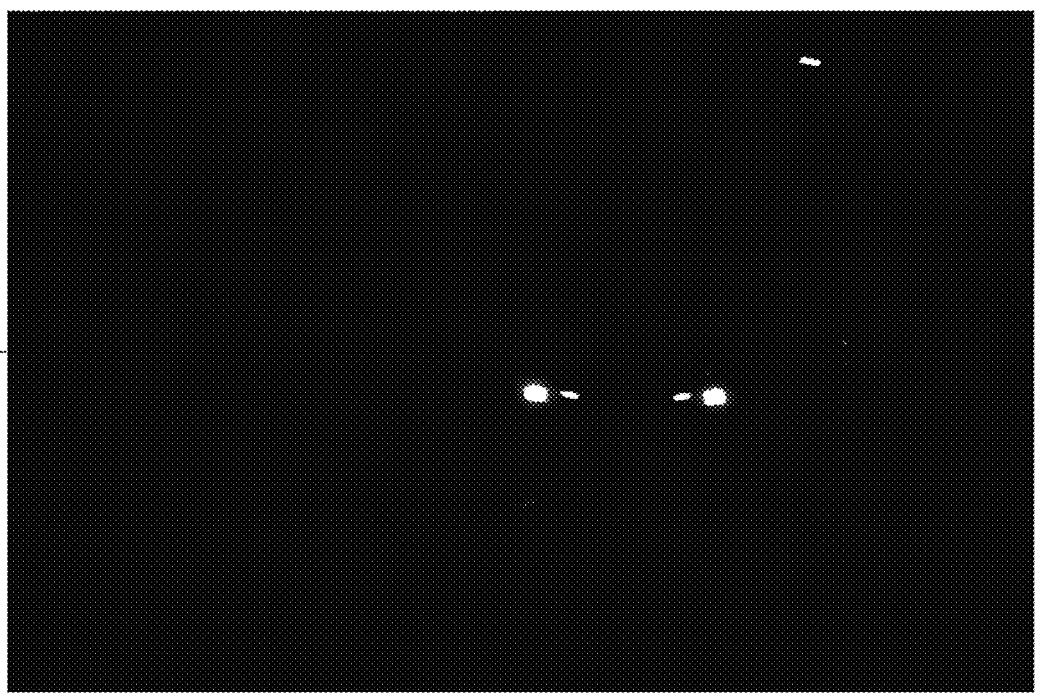
FIG. 8 shows a grayscale image generated by transforming the image of FIG. 7.
Figure 9:
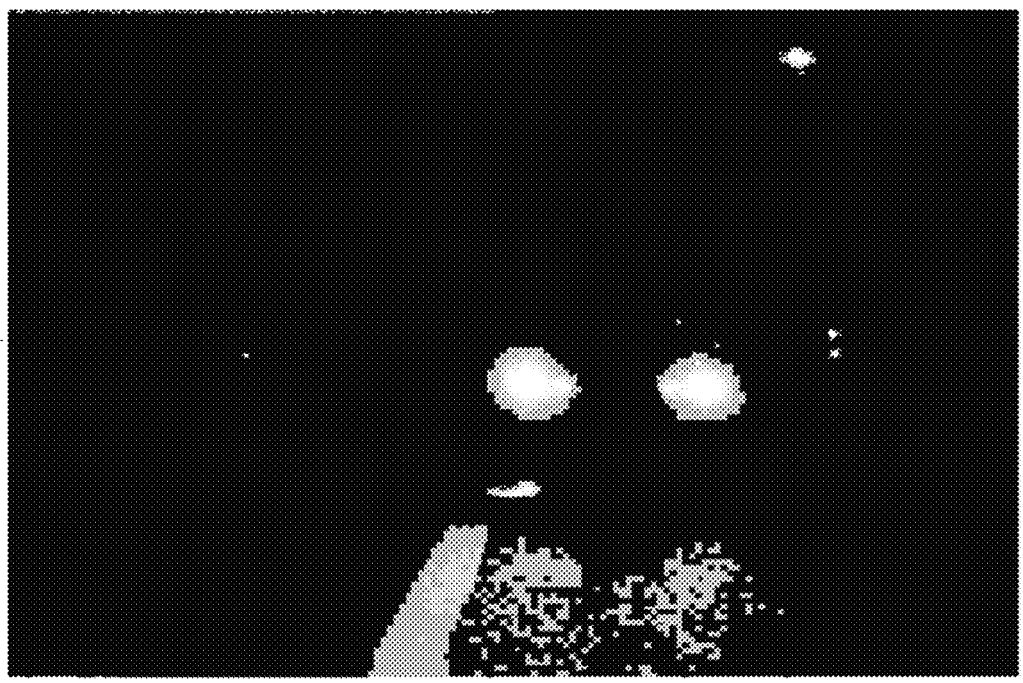
FIG. 9 shows an equalized image generated by performing a histogram equalization step on the grayscale image of FIG. 8.
Figure 10:
FIG. 10 shows a brightness filtering image generated by performing a brightness feature extracting step on the equalized image of FIG. 9.
Figure 11:
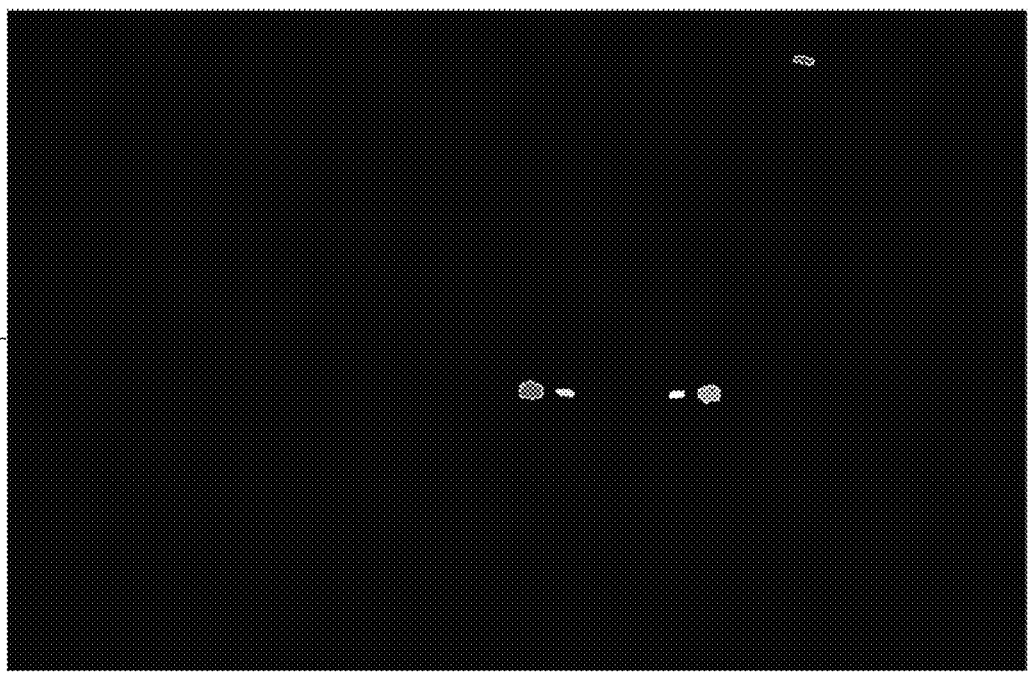
FIG. 11 shows a communicating region labeling image generated by performing a communicating region labeling algorithm on the brightness filtering image of FIG. 10.
Figure 12:
FIG. 12 shows a vehicle lamp candidate image generated by performing a geometric proportion analyzing algorithm and the area filtering algorithm on the communicating region labeling image of FIG. 11.
Figure 13A:
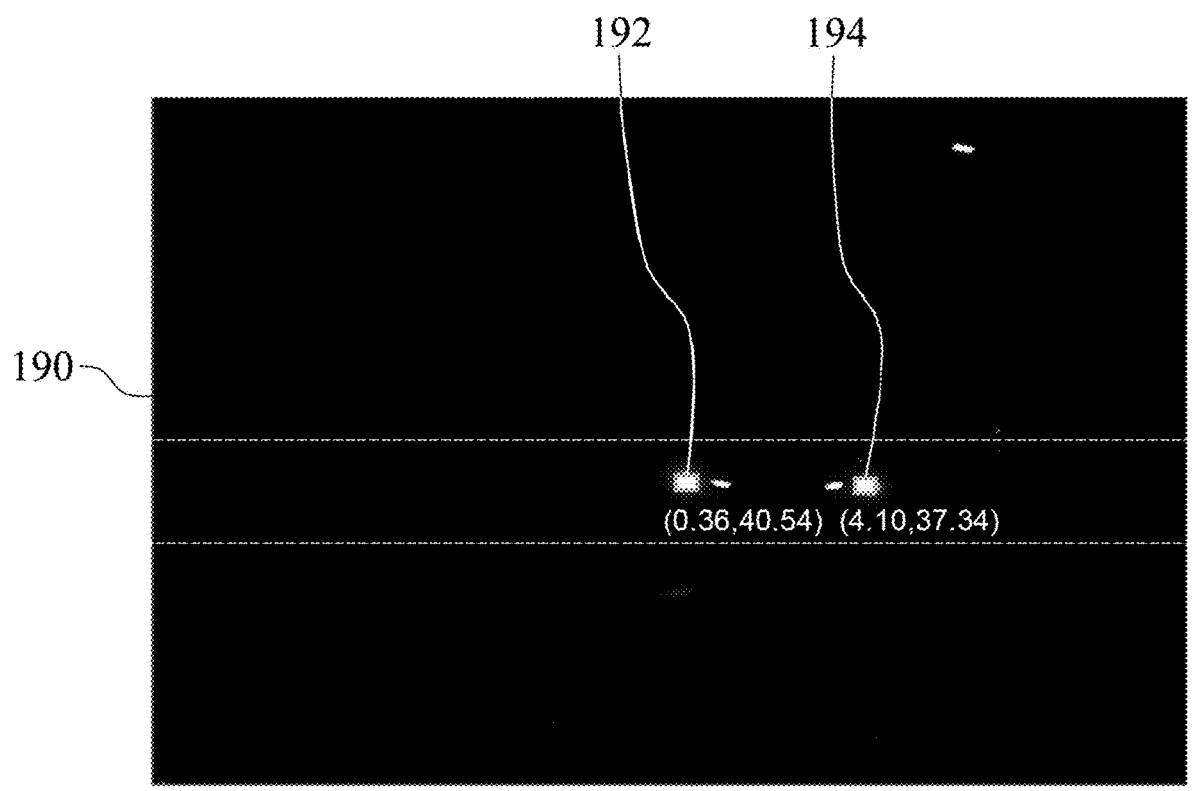
FIG. 13A shows a distance estimating image generated by performing an optical flow filtering step and a distance estimating step on the vehicle lamp candidate image of FIG. 12.
Figure 13B:
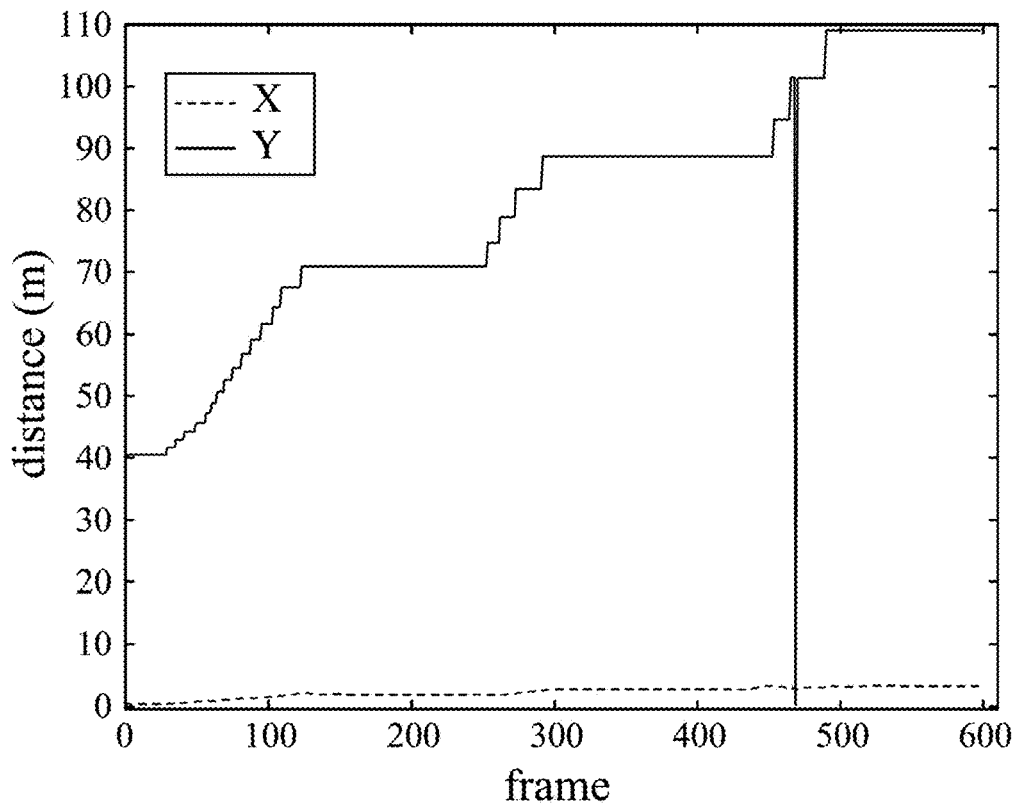
FIG. 13B shows a depth of a left vehicle lamp of the distance estimating image of FIG. 13A.
Figure 13C:
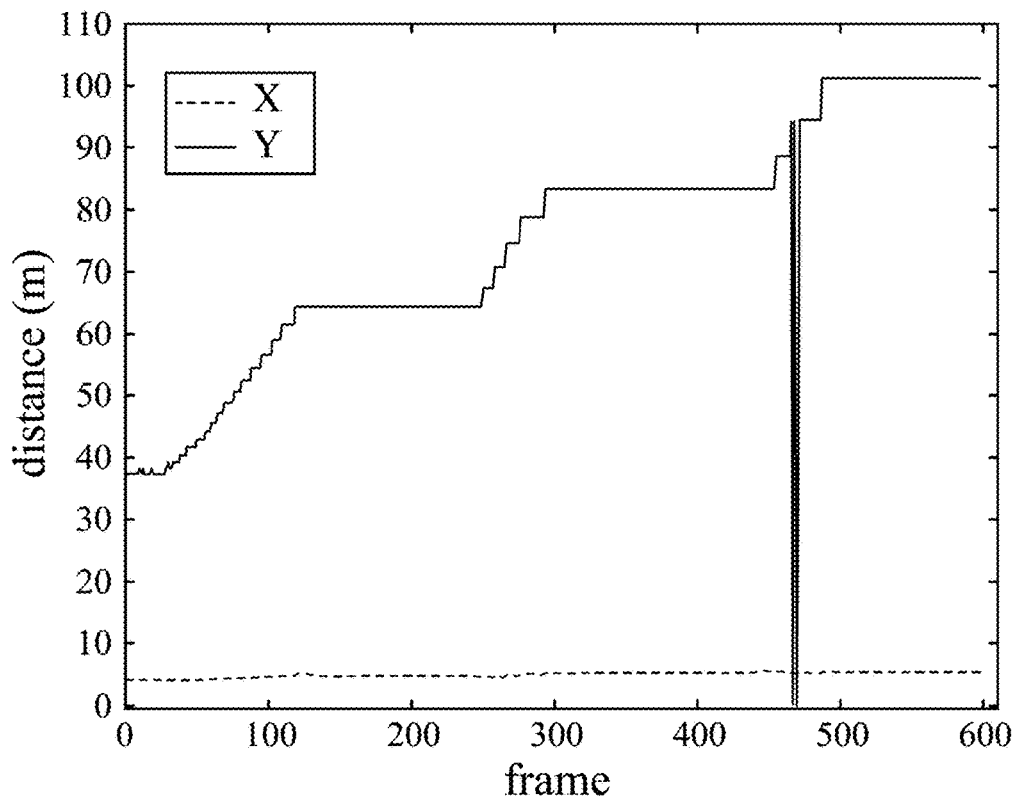
FIG. 13C shows a depth of a right vehicle lamp of the distance estimating image of FIG. 13A.

FIG. 3 shows a flow chart of a nighttime vehicle detecting method 100a based on dynamic light intensity according to another embodiment of the present disclosure. FIG. 4 shows a schematic view of a histogram equalization step S222 of FIG. 3. FIG. 5 shows a schematic view of a communicating region labeling algorithm S242 of FIG. 3. FIG. 6 shows a schematic view of an area filtering algorithm S244 of FIG. 3. FIG. 7 shows an image 120 captured by a camera 300 in a highlight detecting step S22 of the nighttime vehicle detecting method 100a of FIG. 3. FIG. 8 shows a grayscale image 130 generated by transforming the image 120 of FIG. 7. FIG. 9 shows an equalized image 140 generated by performing a histogram equalization step S222 on the grayscale image 130 of FIG. 8. FIG. 10 shows a brightness filtering image 150 generated by performing a brightness feature extracting step S224 on the equalized image 140 of FIG. 9. FIG. 11 shows a communicating region labeling image 160 generated by performing a communicating region labeling algorithm S242 on the brightness filtering image 150 of FIG. 10. FIG. 12 shows a vehicle lamp candidate image 170 generated by performing the area filtering algorithm S244 and a geometric proportion analyzing algorithm S246 on the communicating region labeling image 160 of FIG. 11. FIG. 13A shows a distance estimating image 190 generated by performing an optical flow filtering step S26 and a distance estimating step S28 on the vehicle lamp candidate image 170 of FIG. 12. FIG. 13B shows a depth (X,Y) of a left vehicle lamp 192 of the distance estimating image 190 of FIG. 13A. FIG. 13C shows a depth (X,Y) of a right vehicle lamp 194 of the distance estimating image 190 of FIG. 13A. The nighttime vehicle detecting method 100a based on dynamic light intensity is for detecting a distance Y between the camera 300 of the driving vehicle 110a and the vehicle lamp of the front vehicle 110b in a nighttime. The nighttime vehicle detecting method 100a based on dynamic light intensity includes a highlight detecting step S22, a vehicle lamp judging step S24, an optical flow filtering step S26 and a distance estimating step S28.

The highlight detecting step S22 is for capturing the image 120 by the camera 300 and driving a computing unit 400 to compute the image 120 and then detect a highlight point of the image 120. The highlight point includes a plurality of highlight pixels, and the camera 300 and the computing unit 400 are disposed on the driving vehicle 110a. In detail, the highlight detecting step S22 includes the histogram equalization step S222 and the brightness feature extracting step S224. The histogram equalization step S222 is for counting a number of occurrences $n_i$ of each of a plurality of gray scale values i of the image 120, and changing the gray scale values i to generate a plurality of equalized gray scale values $T_i$ according to the number of occurrences $n_i$. The brightness feature extracting step S224 is for setting a gray scale brightness threshold value $T_1$ and extracting each of the highlight pixels whose brightness value is higher than the gray level brightness threshold value $T_1$. In addition, the histogram equalization step S222 includes a statistical histogram distribution, a probability density function, a cumulative distribution function and a lookup table mapping function. The statistical histogram distribution is for counting the number of occurrences $n_i$ of each of a plurality of gray scale values i of the grayscale image 130. The grayscale image 130 is generated by transforming the image 120. The probability density function is for calculating a probability density $n_i/n$ of the number of occurrences $n_i$. The cumulative distribution function is for changing the gray scale values i to generate the equalized gray scale values $T_i$. The lookup table mapping function is for rounding off the equalized gray scale values $T_i$ to a nearest integer LTI. The cumulative distribution function includes the gray scale values i, the number of occurrences $n_i$, a gray level L and the equalized gray scale values $T_i$. The cumulative distribution function is described as follows:

$$T_i = \left(\frac{n_1 + n_2 + \ldots + n_i}{n}\right)(L-1), n = n_1 + n_2 + \ldots + n_{L-1}. \quad (1)$$

For example, Table 1 lists result values sequentially generated by the statistical histogram distribution, the probability density function, the cumulative distribution function and the lookup table mapping function according to a 4-bit grayscale image 130. FIG. 4 shows a schematic view of the number of occurrences $n_i$ of each of the gray scale values i of Table 1 in the histogram equalization step S222. In Table 1 and FIG. 4, the histogram equalization step S222 of the present disclosure can allow the distribution of the gray scale values i to be more dispersed.

TABLE 1

| | i | | | | | | | |
|---|---|---|---|---|---|---|---|---|
| | 0 | 1 | 2 | 3 | 4 | 5 | 6 | 7 |
| $n_i$ | 15 | 0 | 0 | 0 | 0 | 0 | 0 | 0 |
| $n_i/n$ | 0.042 | 0 | 0 | 0 | 0 | 0 | 0 | 0 |
| $T_i$ | 0.63 | 0.63 | 0.63 | 0.63 | 0.63 | 0.63 | 0.63 | 0.63 |
| LTI | 1 | 1 | 1 | 1 | 1 | 1 | 1 | 1 |

| | i | | | | | | |
|---|---|---|---|---|---|---|---|
| | 8 | 9 | 10 | 11 | 12 | 13 | 14 | 15 |
| $n_i$ | 0 | 70 | 110 | 45 | 80 | 40 | 0 | 0 |
| $n_i/n$ | 0 | 0.194 | 0.306 | 0.125 | 0.222 | 0.111 | 0 | 0 |
| $T_i$ | 0.63 | 3.54 | 8.13 | 10.01 | 13.34 | 15 | 15 | 15 |
| LTI | 1 | 4 | 8 | 10 | 13 | 15 | 15 | 15 |

In the highlight detecting step S22, the computing unit 400 judges whether the highlight pixels are the vehicle lamp or not according to a color of the highlight pixels. Moreover, the highlight detecting step S22 can judge whether the vehicle lamp is a headlight or a taillight. When the color of the highlight pixels is red, the computing unit 400 determines that the highlight pixels are the vehicle lamp which is the taillight. When the color of the highlight pixels is white, the computing unit 400 determines that the highlight pixels are the vehicle lamp which is a headlight.

The vehicle lamp judging step S24 is for driving the computing unit 400 to perform the communicating region labeling algorithm S242 to label the highlight pixels connected to each other as a communicating region value, and then performing the area filtering algorithm S244 to analyze an area of the highlight pixels connected to each other and judge whether the highlight pixels connected to each other are a vehicle lamp or not according to a size of the area. The communicating region labeling algorithm S242 is for labeling the highlight pixels connected to each other in the brightness filtering image 150 as a communicating region value, thus being regarded as a communicating region. Then, the communicating region labeling image 160 is generated, as shown in FIG. 5. The area filtering algorithm S244 is for filtering the area of the highlight pixels connected to each other which is smaller than a predetermined area threshold value. If the area of the highlight pixels connected to each other is greater than or equal to the predetermined area threshold value, the computing unit 400 determines that the highlight pixels connected to each other are the vehicle lamp and need to be retained. On the contrary, if the area of the highlight pixels connected to each other is smaller than the predetermined area threshold value, the computing unit 400 determines that the highlight pixels connected to each other are not the vehicle lamp and need to be removed, as shown in FIG. 6.

In one embodiment, the highlight pixels can be divided into a plurality of highlight pixel groups, and the highlight pixels of each of the highlight pixel groups are connected to each other in the vehicle lamp judging step S24. The computing unit 400 can be configured to perform the communicating region labeling algorithm S242 to label the highlight pixel groups as a plurality of communicating region values, respectively, and then the computing unit 400 is configured to perform the area filtering algorithm S244 to analyze the area of each of the highlight pixel groups and judge whether each of the highlight pixel groups is the vehicle lamp or not according to the size of the area. Therefore, the vehicle lamp judging step S24 of the present disclosure can judge the highlight points having different locations.

In one embodiment, the computing unit 400 can be configured to perform a geometric proportion analyzing algorithm S246 to analyze a geometric proportion of the highlight pixels labeled as the communicating region value in the vehicle lamp judging step S24, and then judge whether the highlight pixels labeled as the communicating region value are the vehicle lamp or not according to the geometric proportion. In detail, if the geometric proportion of the highlight pixels labeled as the communicating region value is smaller than or equal to a predetermined geometric proportion, the computing unit 400 determines that the highlight pixels labeled as the communicating region value are the vehicle lamp and need to be retained. On the contrary, if the geometric proportion of the highlight pixels labeled as the communicating region value is greater than the predetermined geometric proportion, the computing unit 400 determines that the highlight pixels labeled as the communicating region value are not the vehicle lamp and need to be removed.

The optical flow filtering step S26 is for driving the computing unit 400 to perform an optical flow algorithm S262 to obtain a speed Vb of the vehicle lamp, and then filtering the vehicle lamp moved at the speed Vb smaller than a predetermined speed. In detail, the optical flow filtering step S26 includes the optical flow algorithm S262 and a vehicle lamp filtering step S264. The optical flow algorithm S262 is defined as a brightness gradient of each pixel in sequential image planes. When the vehicle lamp in space is projected on the sequential image planes, the brightness gradient of each pixel is constant. In other words, in two adjacent image planes, a pixel (Pi, Pj) is moved to different positions, and the brightness gradient of the pixel is constant and can be described as follows:

$$I(i,j,t)=I(i+\delta i,j+\delta j,t+\delta t) \qquad (2).$$

Wherein I represents brightness, and i, j represent position coordinates of the pixel (Pi, Pj), respectively. t represents time. δi, δj represent motion vectors of the pixel (Pi, Pj), respectively. δt represents time variation. Under a condition of the constant brightness gradient of the pixel, the optical flow (i.e., the speed Vb of the vehicle lamp) generated by a Taylor series expansion and a differential equation can be described as follows:

$$Vb = \begin{bmatrix} u \\ v \end{bmatrix} = \begin{bmatrix} \frac{\delta i}{\delta t} \\ \frac{\delta j}{\delta t} \end{bmatrix}. \qquad (3)$$

Wherein u, v represent the speeds in a horizontal direction and a vertical direction, respectively. In addition, the vehicle lamp filtering step S264 is for judging whether the vehicle lamp retained in the vehicle lamp judging step S24 has a dynamic light characteristic or not according to the speed Vb of the vehicle lamp and a predetermined static speed. If the speed Vb of the vehicle lamp is smaller than or equal to the predetermined static speed, the computing unit 400 determines that the vehicle lamp is noise and does not have the dynamic light characteristic, and the vehicle lamp needs to be removed. On the contrary, if the speed Vb of the vehicle lamp is greater than the predetermined static speed, the computing unit 400 determines that the vehicle lamp has the dynamic light characteristic, and the vehicle lamp needs to be retained. Furthermore, the driving vehicle 110a is moved at a speed Va. The front vehicle 110b is moved at the speed Vb. The camera 300 and the computing unit 400 disposed on the driving vehicle 110a are configured to detect the vehicle lamp of the front vehicle 110b. If the speed Va and the speed Vb are known, the computing unit 400 can judge whether the vehicle lamp of the front vehicle 110b is the headlight or the taillight according to a relative speed between the speed Va and the speed Vb. If the relative speed is greater than a predetermined moving speed, the computing unit 400 determines that the vehicle lamp is the headlight. On the contrary, if the relative speed is smaller than or equal to the predetermined moving speed, the computing unit 400 determines that the vehicle lamp is the taillight.

The distance estimating step S28 is for driving the computing unit 400 to perform a coordinate conversion algorithm to estimate the distance Y between the camera 300 and the vehicle lamp moved at the speed Vb greater than or equal to the predetermined speed. The coordinate conversion algorithm is for converting the position coordinates of the vehicle lamp having the dynamic light characteristic into the depth (X,Y) of the vehicle lamp of the front vehicle 110b according to a height of the camera 300, a coordinate of a vanishing point of a road, an x-axis proportional coefficient of the focal point of the camera 300 and a y-axis proportional coefficient of the focal point of the camera 300. X represents the distance along an x-axis direction between the vehicle lamp and a virtual y-axis in front of the camera 300. Y represents the distance along a y-axis direction between the vehicle lamp and a virtual x-axis in front of the camera 300. The coordinate conversion algorithm may be performed using conventional techniques, which is not described in detail herein.

Figure 14:
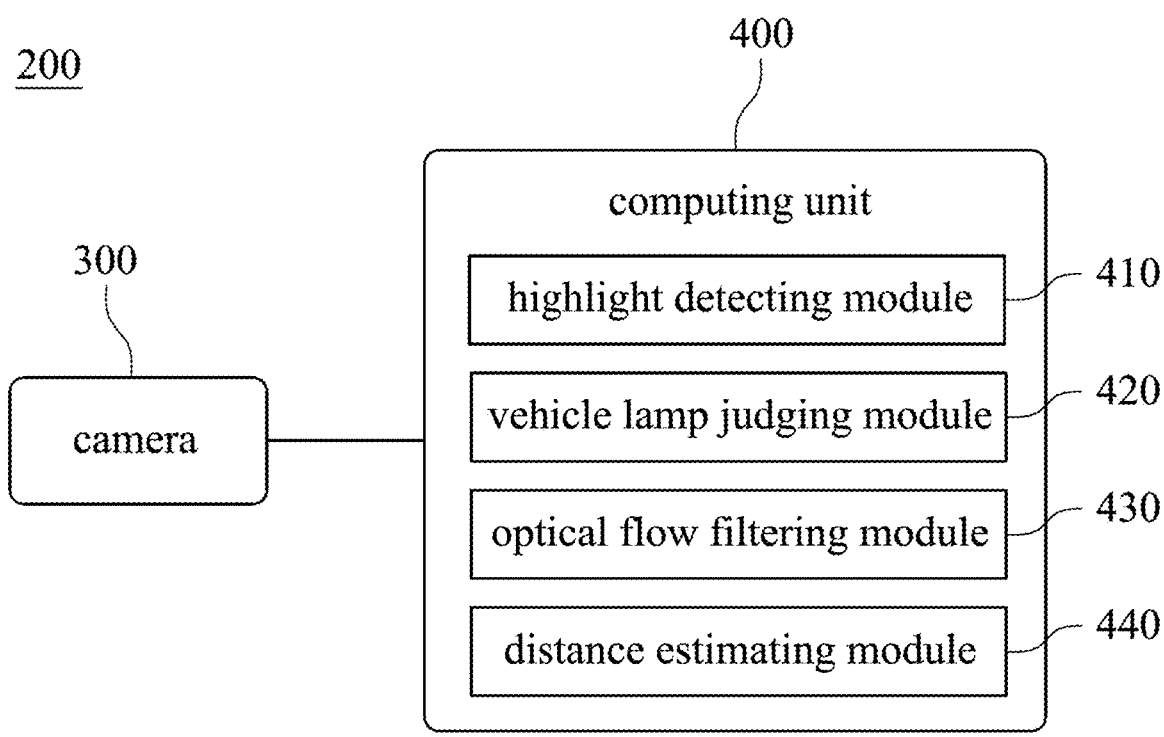
FIG. 14 shows a block diagram of a nighttime vehicle detecting system based on dynamic light intensity according to further another embodiment of the present disclosure.

FIG. 14 shows a block diagram of a nighttime vehicle detecting system 200 based on dynamic light intensity according to further another embodiment of the present disclosure. In FIGS. 1, 2, 3, 7 and 14, the nighttime vehicle detecting system 200 based on dynamic light intensity may be used to perform the nighttime vehicle detecting methods 100, 100a based on dynamic light intensity. The nighttime vehicle detecting system 200 based on dynamic light intensity includes a camera 300 and a computing unit 400.

The camera 300 is disposed on a driving vehicle 110a and configured to capture an image 120. An angle and light receiving efficiency of the camera 300 can be adjusted according to a plurality of environmental parameters. The environmental parameters include an environmental brightness and a daytime/nighttime detection.

The computing unit 400 is disposed on the driving vehicle 110a and includes a highlight detecting module 410, a vehicle lamp judging module 420, an optical flow filtering module 430 and a distance estimating module 440. The highlight detecting module 410 is signally connected to the camera 300. The highlight detecting module 410 is configured to compute the image 120 and then detect a highlight point of the image 120, and the highlight point includes a plurality of highlight pixels. The highlight detecting module 410 is used to perform the highlight detecting steps S12, S22. The vehicle lamp judging module 420 is signally connected to the highlight detecting module 410. The vehicle lamp judging module 420 is configured to perform a communicating region labeling algorithm S242 to label the highlight pixels connected to each other as a communicating region value. Then, the vehicle lamp judging module 420 is configured to perform an area filtering algorithm S244 to analyze an area of the highlight pixels connected to each other and judge whether the highlight pixels connected to each other are a vehicle lamp or not according to a size of the area. The vehicle lamp judging module 420 is used to perform the vehicle lamp judging steps S14, S24. The optical flow filtering module 430 is signally connected to the vehicle lamp judging module 420. The optical flow filtering module 430 is configured to perform an optical flow algorithm S262 to obtain a speed Vb of the vehicle lamp, and then filter the vehicle lamp moved at the speed Vb smaller than a predetermined speed. The optical flow filtering module 430 is used to perform the optical flow filtering steps S16, S26. The distance estimating module 440 is signally connected to the optical flow filtering module 430. The distance estimating module 440 is configured to perform a coordinate conversion algorithm to estimate a distance Y between the vehicle lamp and the camera 300. The distance estimating module 440 is used to perform the distance estimating steps S18, S28. In addition, the computing unit 400 may be a personal computer, an electronic control unit (ECU), a microprocessor, or other electronic controllers for use in the driving vehicle 110a. In one embodiment, the point cloud processing module 140 utilizes the electronic control unit for processing. Therefore, the nighttime vehicle detecting system 200 based on dynamic light intensity of the present disclosure utilizes the nighttime vehicle detecting methods 100, 100a to greatly reduce computational complexity and is simpler than conventional classifiers so as to improve a data processing speed.

Figure 15:
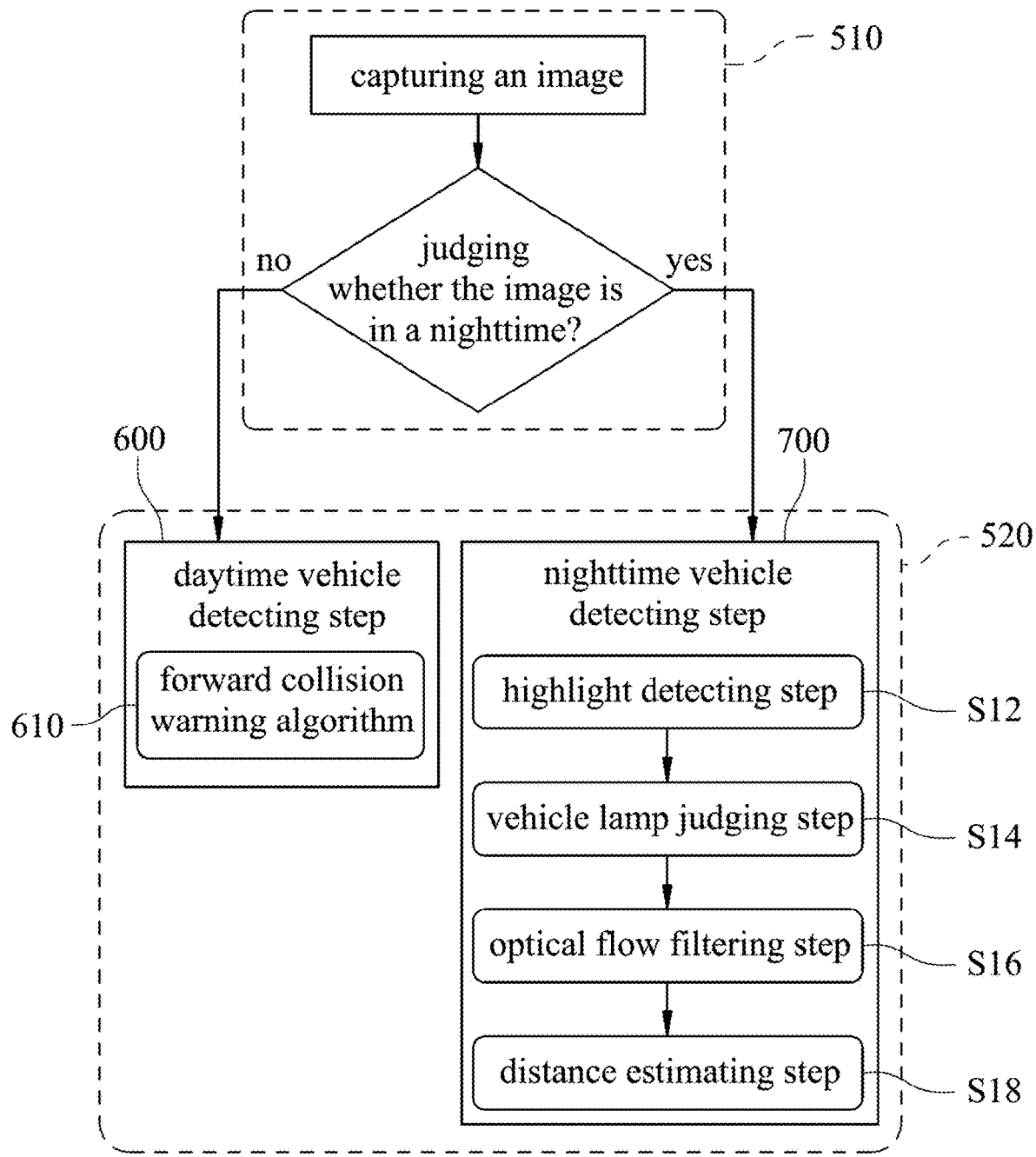
FIG. 15 shows a flow chart of a vehicle detecting method according to still further another embodiment of the present disclosure.

FIG. 15 shows a flow chart of a vehicle detecting method 500 according to still further another embodiment of the present disclosure. In FIGS. 1, 2, 3, 7 and 15, the vehicle detecting method 500 is for detecting a front vehicle 110b of an image, and includes an image analyzing step 510 and a vehicle detecting step 520.

The image analyzing step 510 is for capturing an image by a camera 300 and driving a computing unit 400 to analyze a sky brightness value of a sky region of the image and compare a predetermined brightness value with the sky brightness value to judge whether the image is in a daytime or a nighttime. The camera 300 and the computing unit 400 are disposed on a driving vehicle 110a.

The vehicle detecting step 520 is for driving the computing unit 400 to perform a daytime vehicle detecting step 600 or a nighttime vehicle detecting step 700. When the image is in the daytime, the daytime vehicle detecting step 600 is performed. When the image is in the nighttime, the nighttime vehicle detecting step 700 is performed. In detail, the daytime vehicle detecting step 600 is for detecting a distance Y between the front vehicle 110b and the camera 300 according to a forward collision warning (FCW) algorithm 610. The forward collision warning algorithm 610 utilizes a lane line identifying method to identify a lane line of the image, and then judges whether a relative distance between the driving vehicle 110a and the front vehicle 110b is safe or not according to a front vehicle identifying method. The front vehicle identifying method uses an edge detection to find features of the front vehicle 110b from the image, such as a shadow edge of the vehicle (a horizontal edge) and two symmetrical edges of the vehicle (two vertical edges). The features of the front vehicle 110b can be found by the edge detection to be classified as an object. The object has an object width and an object height. Then, the object width and the object height are used to judge whether the object is a vehicle or not and determine a plurality of pixel positions of the front vehicle 110b in the image. Finally, a distance between the driving vehicle 110a and the front vehicle 110b can be estimated via a front distance estimating model. The lane line identifying method and the front distance estimating model may be performed using conventional techniques, which are not described in detail herein. Moreover, the nighttime vehicle detecting step 700 includes a highlight detecting step S12, a vehicle lamp judging step S14, an optical flow filtering step S16 and a distance estimating step S18. In FIG. 15, the detail of the highlight detecting step S12, the vehicle lamp judging step S14, the optical flow filtering step S16 and the distance estimating step S18 is the same as the embodiments of FIG. 1, and will not be described again herein. Accordingly, the daytime vehicle detecting step 600 and the nighttime vehicle detecting step 700 of the vehicle detecting method 500 of the present disclosure can be adaptively selected according to the image, so that a more accurate position of the vehicle lamp can be obtained instantly in the daytime or the nighttime.

According to the aforementioned embodiments and examples, the advantages of the present disclosure are described as follows.

1. The nighttime vehicle detecting method based on dynamic light intensity of the present disclosure utilizes image processing techniques to detect the highlight point of the image, and the optical flow algorithm is used to eliminate noises located outside of an original lane so as to obtain an accurate position of the vehicle lamp in real time.

2. The nighttime vehicle detecting system based on dynamic light intensity of the present disclosure utilizes the nighttime vehicle detecting method to greatly reduce computational complexity and is simpler than conventional classifiers so as to improve a data processing speed.

3. The daytime vehicle detecting step and the nighttime vehicle detecting step of the vehicle detecting method of the present disclosure can be adaptively selected according to the image, so that a more accurate position of the vehicle lamp can be obtained instantly in the daytime or the nighttime.

4. The front vehicle of the present disclosure is a car, but it is not limited thereto. The front vehicle may be a motorcycle or any vehicle having the vehicle lamp so as to greatly increase applicability.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A nighttime vehicle detecting method based on dynamic light intensity, comprising:
providing a highlight detecting step, wherein the highlight detecting step is for capturing an image by a camera and driving a computing unit to compute the image and then detect a highlight point of the image, the highlight point comprises a plurality of highlight pixels, and the camera and the computing unit are disposed on a driving vehicle;
providing a vehicle lamp judging step, wherein the vehicle lamp judging step is for driving the computing unit to perform a communicating region labeling algorithm to label the highlight pixels connected to each other as a communicating region value, and then performing an area filtering algorithm to analyze an area of the highlight pixels connected to each other and judge whether the highlight pixels connected to each other are a vehicle lamp or not according to a size of the area;
providing an optical flow filtering step, wherein the optical flow filtering step is for driving the computing unit to perform an optical flow algorithm to obtain a speed of the vehicle lamp, and then filtering the vehicle lamp moved at the speed smaller than a predetermined speed; and
providing a distance estimating step, wherein the distance estimating step is for driving the computing unit to perform a coordinate conversion algorithm to estimate a distance between the vehicle lamp and the camera;
wherein the highlight detecting step comprises:
providing a histogram equalization step, wherein the histogram equalization step is for counting a number of occurrences of each of a plurality of gray scale values of the image, and changing the gray scale values to generate a plurality of equalized gray scale values according to the number of occurrences.

2. The nighttime vehicle detecting method of claim 1, wherein the highlight detecting step further comprises:
providing a brightness feature extracting step, wherein the brightness feature extracting step is for setting a gray scale brightness threshold value and extracting each of the highlight pixels whose brightness value is higher than the gray level brightness threshold value.

3. The nighttime vehicle detecting method of claim 1, wherein the histogram equalization step comprises:
a cumulative distribution function for changing the gray scale values, wherein the cumulative distribution function comprises the gray scale values, the number of occurrences, a gray level and the equalized gray scale values, the gray scale values are represented as i, the number of occurrences is represented as $n_i$, the gray level is represented as L, the equalized gray scale values are represented as $T_i$, and the cumulative distribution function is described as follows:

$$T_i = \left(\frac{n_1 + n_2 + \ldots + n_i}{n}\right)(L-1), n = n_1 + n_2 + \ldots + n_{L-1}.$$

4. The nighttime vehicle detecting method of claim 1, wherein,
in the highlight detecting step, the computing unit judges whether the highlight pixels are the vehicle lamp or not according to a color of the highlight pixels;
when the color of the highlight pixels is red, the computing unit determines that the highlight pixels are the vehicle lamp which is a taillight; and
when the color of the highlight pixels is white, the computing unit determines that the highlight pixels are the vehicle lamp which is a headlight.

5. The nighttime vehicle detecting method of claim 1, wherein,
in the vehicle lamp judging step, the highlight pixels are divided into a plurality of highlight pixel groups, the highlight pixels of each of the highlight pixel groups are connected to each other, the computing unit is configured to perform the communicating region labeling algorithm to label the highlight pixel groups as a plurality of communicating region values, respectively, and then the computing unit is configured to perform the area filtering algorithm to analyze the area of each of the highlight pixel groups and judge whether each of the highlight pixel groups is the vehicle lamp or not according to the size of the area.

6. The nighttime vehicle detecting method of claim 1, wherein,
in the vehicle lamp judging step, the computing unit is configured to perform a geometric proportion analyzing algorithm to analyze a geometric proportion of the highlight pixels labeled as the communicating region value, and then judge whether the highlight pixels labeled as the communicating region value are the vehicle lamp or not according to the geometric proportion.

7. A nighttime vehicle detecting system based on dynamic light intensity, comprising:
a camera disposed on a driving vehicle and configured to capture an image; and
a computing unit disposed on the driving vehicle and comprising:
a highlight detecting module signally connected to the camera, wherein the highlight detecting module is configured to compute the image and then detect a highlight point of the image, and the highlight point comprises a plurality of highlight pixels;
a vehicle lamp judging module signally connected to the highlight detecting module, wherein the vehicle lamp judging module is configured to perform a communicating region labeling algorithm to label the highlight pixels connected to each other as a communicating region value, and then perform an area filtering algorithm to analyze an area of the highlight pixels connected to each other and judge whether the highlight pixels connected to each other are a vehicle lamp or not according to a size of the area;

an optical flow filtering module signally connected to the vehicle lamp judging module, wherein the optical flow filtering module is configured to perform an optical flow algorithm to obtain a speed of the vehicle lamp, and then filter the vehicle lamp moved at the speed smaller than a predetermined speed; and a distance estimating module signally connected to the optical flow filtering module, wherein the distance estimating module is configured to perform a coordinate conversion algorithm to estimate a distance between the vehicle lamp and the camera;

wherein the highlight detecting module is configured to count a number of occurrences of each of a plurality of gray scale values of the image, and change the gray scale values to generate a plurality of equalized gray scale values according to the number of occurrences.

8. The nighttime vehicle detecting system of claim 7, wherein,
the highlight detecting module is configured to set a gray scale brightness threshold value and extract each of the highlight pixels whose brightness value is higher than the gray level brightness threshold value.

9. The nighttime vehicle detecting system of claim 7, wherein,
the highlight detecting module is configured to perform a cumulative distribution function for changing the gray scale values, the cumulative distribution function comprises the gray scale values, the number of occurrences, a gray level and the equalized gray scale values, the gray scale values are represented as i, the number of occurrences is represented as n the gray level is represented as L, the equalized gray scale values are represented as $T_i$, and the cumulative distribution function is described as follows:

$$T_i = \left(\frac{n_1 + n_2 + \ldots + n_i}{n}\right)(L-1), n = n_1 + n_2 + \ldots + n_{L-1}.$$

10. The nighttime vehicle detecting system of claim 7, wherein,
the computing unit judges whether the highlight pixels are the vehicle lamp or not according to a color of the highlight pixels;
when the color of the highlight pixels is red, the computing unit determines that the highlight pixels are the vehicle lamp which is a taillight; and
when the color of the highlight pixels is white, the computing unit determines that the highlight pixels are the vehicle lamp which is a headlight.

11. The nighttime vehicle detecting system of claim 7, wherein,
the highlight pixels are divided into a plurality of highlight pixel groups, the highlight pixels of each of the highlight pixel groups are connected to each other, the vehicle lamp judging module is configured to perform the communicating region labeling algorithm to label the highlight pixel groups as a plurality of communicating region values, respectively, and then the vehicle lamp judging module is configured to perform the area filtering algorithm to analyze the area of each of the highlight pixel groups and judge whether each of the highlight pixel groups is the vehicle lamp or not according to the size of the area.

12. The nighttime vehicle detecting system of claim 7, wherein,
the vehicle lamp judging module is configured to perform a geometric proportion analyzing algorithm to analyze a geometric proportion of the highlight pixels labeled as the communicating region value, and then judge whether the highlight pixels labeled as the communicating region value are the vehicle lamp or not according to the geometric proportion.

13. A vehicle detecting method for detecting a front vehicle of an image, the vehicle detecting method comprising:

providing an image analyzing step, wherein the image analyzing step is for capturing an image by a camera and driving a computing unit to analyze a sky brightness value of a sky region of the image and compare a predetermined brightness value with the sky brightness value to judge whether the image is in a daytime or a nighttime, and the camera and the computing unit are disposed on a driving vehicle; and providing a vehicle detecting step, wherein the vehicle detecting step is for driving the computing unit to perform a daytime vehicle detecting step or a nighttime vehicle detecting step, when the image is in the daytime, the daytime vehicle detecting step is performed, and when the image is in the nighttime, the nighttime vehicle detecting step is performed;

wherein the daytime vehicle detecting step is for detecting a distance between the front vehicle and the camera according to a forward collision warning algorithm;

wherein the nighttime vehicle detecting step comprises:
providing a highlight detecting step, wherein the highlight detecting step is for driving the computing unit to compute the image and then detect a highlight point of the image, and the highlight point comprises a plurality of highlight pixels;

providing a vehicle lamp judging step, wherein the vehicle lamp judging step is for driving the computing unit to perform a communicating region labeling algorithm to label the highlight pixels connected to each other as a communicating region value, and then performing an area filtering algorithm to analyze an area of the highlight pixels connected to each other and judge whether the highlight pixels connected to each other are a vehicle lamp or not according to a size of the area;

providing an optical flow filtering step, wherein the optical flow filtering step is for driving the computing unit to perform an optical flow algorithm to obtain a speed of the vehicle lamp, and then filtering the vehicle lamp moved at the speed smaller than a predetermined speed; and providing a distance estimating step, wherein the distance estimating step is for driving the computing unit to perform a coordinate conversion algorithm to estimate a distance between the vehicle lamp and the camera;

wherein the highlight detecting step comprises:
providing a histogram equalization step, wherein the histogram equalization step is for counting a number of occurrences of each of a plurality of gray scale values of the image, and changing the gray scale values to generate a plurality of equalized gray scale values according to the number of occurrences.

14. The vehicle detecting method of claim 13, wherein, in the image analyzing step, the sky region is located above a predetermined skyline;
when the sky brightness value is greater than or equal to the predetermined brightness value, the computing unit is configured to determine that the image is in the daytime; and
when the sky brightness value is smaller than the predetermined brightness value, the computing unit is configured to determine that the image is in the nighttime.

15. The vehicle detecting method of claim 13, wherein the highlight detecting step further comprises:
providing a brightness feature extracting step, wherein the brightness feature extracting step is for setting a gray scale brightness threshold value and extracting each of the highlight pixels whose brightness value is higher than the gray level brightness threshold value.

16. The vehicle detecting method of claim 13, wherein the histogram equalization step comprises:
a cumulative distribution function for changing the gray scale values, wherein the cumulative distribution function comprises the gray scale values, the number of occurrences, a gray level and the equalized gray scale values, the gray scale values are represented as i, the number of occurrences is represented as $n_i$, the gray level is represented as L, the equalized gray scale values are represented as $T_i$, and the cumulative distribution function is described as follows:

$$T_i = \left(\frac{n_1 + n_2 + \ldots + n_i}{n}\right)(L-1), n = n_1 + n_2 + \ldots + n_{L-1}.$$

17. The vehicle detecting method of claim 13, wherein, in the highlight detecting step, the computing unit judges whether the highlight pixels are the vehicle lamp or not according to a color of the highlight pixels;
when the color of the highlight pixels is red, the computing unit determines that the highlight pixels are the vehicle lamp which is a taillight; and
when the color of the highlight pixels is white, the computing unit determines that the highlight pixels are the vehicle lamp which is a headlight.

18. The vehicle detecting method of claim 13, wherein, in the vehicle lamp judging step, the highlight pixels are divided into a plurality of highlight pixel groups, the highlight pixels of each of the highlight pixel groups are connected to each other, the computing unit is configured to perform the communicating region labeling algorithm to label the highlight pixel groups as a plurality of communicating region values, respectively, and then the computing unit is configured to perform the area filtering algorithm to analyze the area of each of the highlight pixel groups and judge whether each of the highlight pixel groups is the vehicle lamp or not according to the size of the area.

19. The vehicle detecting method of claim 13, wherein, in the vehicle lamp judging step, the computing unit is configured to perform a geometric proportion analyzing algorithm to analyze a geometric proportion of the highlight pixels labeled as the communicating region value, and then judge whether the highlight pixels labeled as the communicating region value are the vehicle lamp or not according to the geometric proportion.

* * * * *